United States Patent [19]
Baron et al.

[11] Patent Number: 5,628,026
[45] Date of Patent: May 6, 1997

[54] MULTI-DIMENSIONAL DATA TRANSFER IN A DATA PROCESSING SYSTEM AND METHOD THEREFOR

[75] Inventors: Natan Baron, Oranit; Eliezer Zand, Bat-Yam; Oded Norman, Rosh-Hayin; Zvika Rozenshein, Cfar-Saba; Elchanan Rushinek, Petah-Tikva, all of Israel

[73] Assignee: Motorola, Inc., Schaumburg, Ill.

[21] Appl. No.: 349,218

[22] Filed: Dec. 5, 1994

[51] Int. Cl.[6] .............................. G06F 13/28; G06F 12/00
[52] U.S. Cl. .................................... 395/821; 395/842
[58] Field of Search ..................... 395/842, 843, 395/846, 854, 410, 421.07, 200.07, 115, 821

[56] References Cited

U.S. PATENT DOCUMENTS

| | | | |
|---|---|---|---|
| 4,204,250 | 5/1980 | Getson, Jr. et al. | 395/854 |
| 4,779,084 | 10/1988 | Tanaka et al. | 345/200 |
| 4,797,809 | 1/1989 | Sato et al. | 395/846 |
| 4,797,851 | 1/1989 | Suzuki et al. | 395/846 |
| 4,935,867 | 6/1990 | Wang et al. | 364/200 |
| 4,940,970 | 7/1990 | Fujisaku | 340/726 |
| 5,109,497 | 4/1992 | Bolstad et al. | 395/410 |
| 5,109,501 | 4/1992 | Kaneko et al. | 395/846 |
| 5,119,487 | 6/1992 | Taniai et al. | 395/842 |
| 5,175,825 | 12/1992 | Starr | 395/325 |
| 5,187,783 | 2/1993 | Mansfield et al. | 395/425 |
| 5,287,471 | 2/1994 | Katayose et al. | 395/842 |
| 5,333,290 | 7/1994 | Kato | 395/400 |
| 5,481,756 | 1/1996 | Kanno | 395/842 |
| 5,561,816 | 10/1996 | Mitsuhira et al. | 395/842 |

OTHER PUBLICATIONS

M. Morris Mano, "Computer System Architecture", 1976, pp. 416–420.

*Primary Examiner*—Gopal C. Ray
*Attorney, Agent, or Firm*—Daniel D. Hill

[57] ABSTRACT

To execute a three-dimensional DMA transfer, a transfer counter register (76), which is partitioned into three sections, is loaded with initial counter values. Each section of the counter register (76) is independently controlled by a counter (72, 73, 74). Data is transferred from consecutive generated addresses for a first predetermined number of times as determined by the value in the first section of the counter register (76). An offset value is then added to a last generated address. The process is repeated for a second predetermined number of times. Then another offset value is added to the generated address. This entire process is repeated for a given number of times as determined by the third section of the register (76). The initial counter values are reloaded into counter register (76) from a backup register (77), insuring that a DMA controller (80) is ready if a new transfer request requires the same counter values as the previous transfer.

18 Claims, 7 Drawing Sheets

DCOL (LOWER ORDER BITS OF DMA COUNTER REGISTER 76)
DCOH (HIGHER ORDER BITS OF DMA COUNTER REGISTER 76)
DSR (DMA SOURCE REGISTER)
DORØ (DMA OFFSET REGISTER)

FIG.3

DCOL (LOWER ORDER BITS OF DMA COUNTER REGISTER 76)
DCOH (HIGHER ORDER BITS OF DMA COUNTER REGISTER 76)
DSR (DMA SOURCE REGISTER)
DORØ (DMA OFFSET REGISTER)

| # | BEFORE THE TRANSFER | | TRANSFERRED SOURCE ADDRESS | AFTER THE TRANSFER | |
|---|---|---|---|---|---|
| | DSR | DCOH:DCOM:DCOL | | DSR | DCOH:DCOM:DCOL |
| 1 | S | 1:1:2 | S | S+1 | 1:1:1 |
| 2 | S+1 | 1:1:1 | S+1 | S+2 | 1:1:0 |
| 3 | S+2 | 1:1:0 | S+2 | S+O1+2 | 1:0:2 |
| 4 | S+O1+2 | 1:0:2 | S+O1+2 | S+O1+3 | 1:0:1 |
| 5 | S+O1+3 | 1:0:1 | S+O1+3 | S+O1+4 | 1:0:0 |
| 6 | S+O1+4 | 1:0:0 | S+O1+4 | S+O1+O2+4 | 0:1:2 |
| 7 | S+O1+O2+4 | 0:1:2 | S+O1+O2+4 | S+O1+O2+5 | 0:1:1 |
| 8 | S+O1+O2+5 | 0:1:1 | S+O1+O2+5 | S+O1+O2+6 | 0:1:0 |
| 9 | S+O1+O2+6 | 0:1:0 | S+O1+O2+6 | S+2O1+O2+6 | 0:0:2 |
| 10 | S+2O1+O2+6 | 0:0:2 | S+2O1+O2+6 | S+2O1+O2+7 | 0:0:1 |
| 11 | S+2O1+O2+7 | 0:0:1 | S+2O1+O2+7 | S+2O1+O2+8 | 0:0:0 |
| 12 | S+2O1+O2+8 | 0:0:0 | S+2O1+O2+8 | S+2O1+2O2+8 | 1:1:2 |

S = PRELOAD VALUE IN DMA SOURCE REGISTER (DSR)

DCOH:DCOM:DCOL = VALUES IN DMA COUNTER REGISTER

O1 = FIRST OFFSET VALUE

O2 = SECOND OFFSET VALUE

*FIG. 6*

| BIT NUMBER: | 23 | 22 | 21 | 20 | 19 | ... | 10 | 9 | 8 | 7 | 6 | 5 | 4 | 0 |
|---|---|---|---|---|---|---|---|---|---|---|---|---|---|---|
| | DE 83 | | DTM2 79 | DTM1 80 | DTM0 81 | ... | D3D 93 | DA5 87 | DA4 88 | DA3 89 | DA2 90 | DA1 91 | DA0 92 | ... |

*FIG. 7*  ← 78

MULTI-DIMENSIONAL DATA TRANSFER IN A DATA PROCESSING SYSTEM AND METHOD THEREFOR

FIELD OF THE INVENTION

This invention relates generally to a data processing system, and more particularly, to multi-dimensional data transfers in a data processing system.

BACKGROUND OF THE INVENTION

In a data processing system, a direct memory access (DMA) controller is sometimes used to access a memory independently of a central processing unit (CPU). A conventional DMA controller includes its own source and destination registers and an address counter register. The CPU causes initial transfer parameters for a DMA transfer to be loaded in the DMA controller and initiates a DMA transfer of data from a source memory space to a destination memory space. The memory spaces may be either internal or external to the data processing system. The transfer parameters include source and destination addresses, and a counter value. The DMA controller then controls the actual transfer of data, freeing the CPU for other tasks. An entire block of data is usually transferred during each DMA transfer. The size of the block of data is controlled by the counter value.

When a DMA transfer is initiated, the first address to be transferred is provided to the source or destination registers. An address counter register is loaded with the counter value to define the number of address transfers. After each transfer, the address source register or destination register, or both, is incremented and the address counter value is decremented. The transfer is complete when the counter value in the address counter register equals zero. The DMA controller then interrupts the CPU to inform the CPU that the DMA transfer is complete.

In the conventional DMA controller, each time a DMA transfer of data is required, the CPU loads new transfer parameters and initiates the DMA transfer. The CPU is interrupted each time a DMA transfer is complete. As a result, the CPU is involved at both the beginning and the end of each DMA transfer.

SUMMARY OF THE INVENTION

Accordingly, there is provided, in one form, a method for accessing data in a data processing system. The method includes the steps of storing a first address of a location in a memory, storing a counter value, accessing data in the memory at consecutive generated addresses for a first predetermined number of times, as determined by the counter value, starting at the first address, adding an offset value to a last generated address, and accessing data in the memory at consecutive generated addresses for a second predetermined number of times.

In another form, a direct memory access controller for performing a multi-dimensional data transfer in a data processing system is provided. The direct memory access controller includes an address storage element, an offset storage element, an adder, a counter storage element, and a control logic circuit. The address storage element is for storing an address and the offset storage element for storing an offset value. The adder is coupled to the address storage element and to the offset storage element and is for incrementing the address by one, or for adding the offset value to the address. The counter storage element is partitioned into at least two sections, each section of the at least two sections contains parameters for controlling the multi-dimensional data transfer. The control logic circuit is coupled to the adder, the offset storage element, the address storage element, and the counter, and controls the multi-dimensional data transfer based on the parameters contained in the offset storage element and the counter storage element.

These and other features and advantages will be more clearly understood from the following detailed description taken in conjunction with the accompanying drawings.

DESCRIPTION OF A PREFERRED EMBODIMENT

Generally, the present invention provides multi-dimensional DMA (direct memory access) transfers of data in a data processing system. A DMA counter register is partitioned into multiple sections. Each of the multiple sections is controlled independently by a counter. To perform a three-dimensional data transfer, a processor initializes the counter register. A DMA controller accesses data at consecutive generated addresses for a predetermined number of times. The predetermined number of times is determined by the value in the first section of the counter register. Then a value in a first offset register is added to the generated address. The process described so far is repeated for another predetermined number of times as determined by the value in the second section of the counter register. Then another offset is added to the generated address. This entire process is repeated for a another predetermined number of times as determined by the value in the third section of the counter register. At the end of the transfer, the DMA controller reloads, or reinitializes, the counter register values so that the counter values are ready if a new transfer requires the same counter values as the previous transfer. A backup register stores the initial counter values that are to be reloaded at the end of a transfer. Another trigger will cause a new block transfer. The illustrated embodiments disclose a two-dimensional transfer, a three-dimensional transfer and a line-by-line transfer mode, however, in other embodiments, more dimensions may be added and more transfer modes may be used.

The terms "assert" and "negate" will be used when referring to the rendering of a signal, status bit, or similar apparatus into its logically true or logically false state, respectively. If the logically true state is a digital logic level one, the logically false state will be a digital logic level zero. And if the logically true state is a digital logic level zero, the logically false state will be a digital logic level one. The term "bus" will be used to refer to a plurality of signals which may be used to transfer one or more various types of information, such as data, addresses, control, or status.

Figure 1:
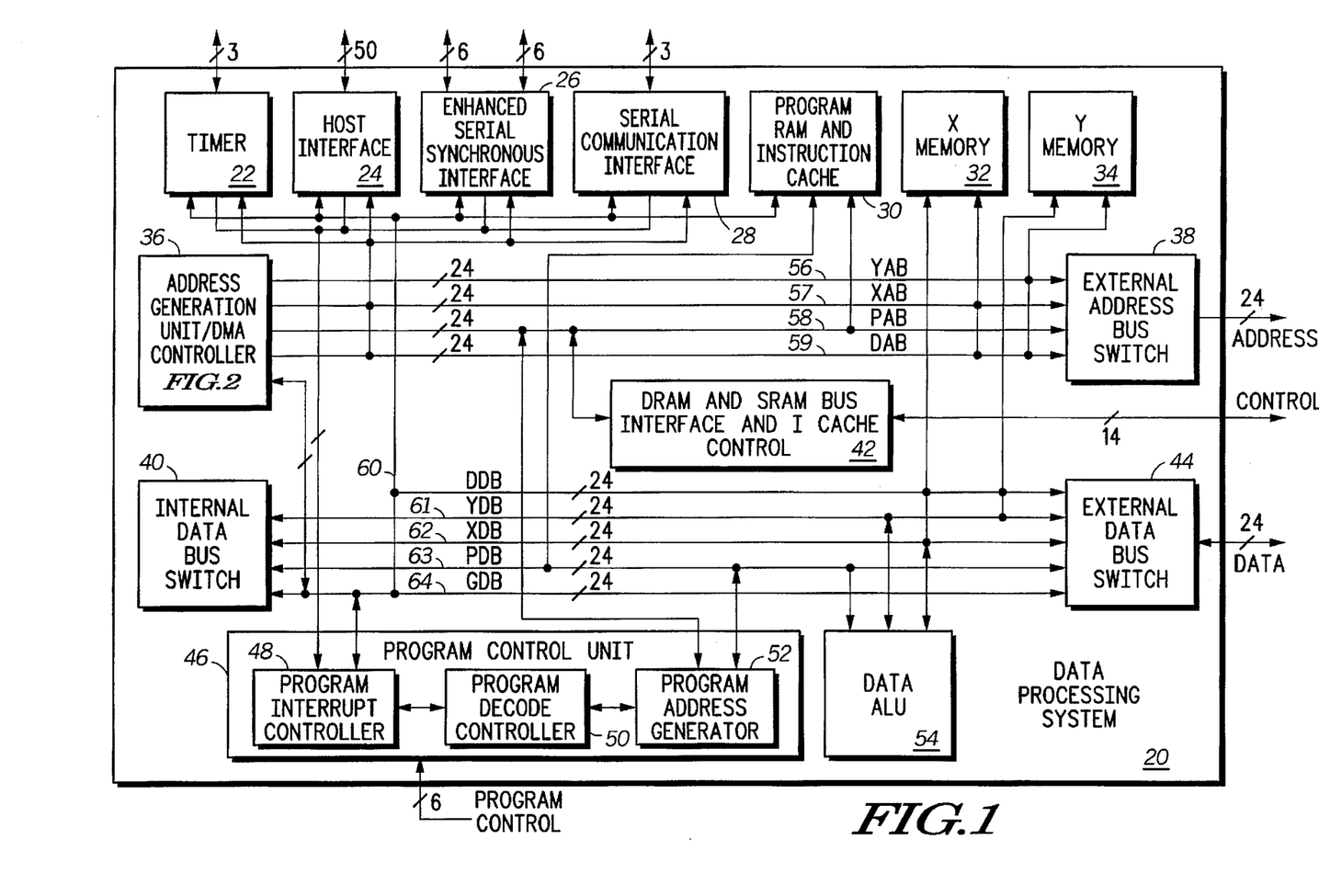
FIG. 1 illustrates in block diagram form, a data processing system in accordance with the present invention.
Figure 2:
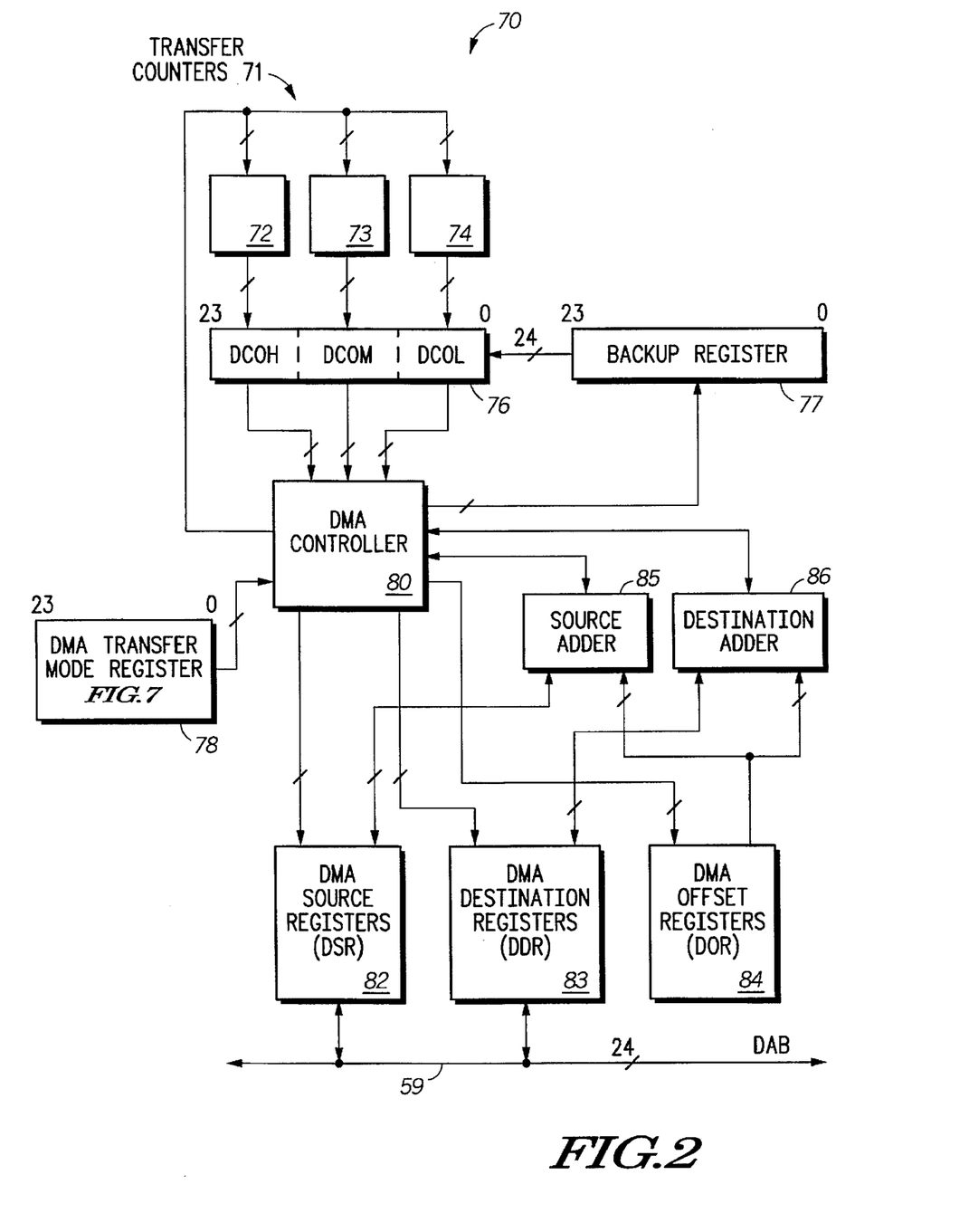
FIG. 2 illustrates in block diagram form, a portion of address generation unit of the data processing system of FIG. 1.
Figure 3:
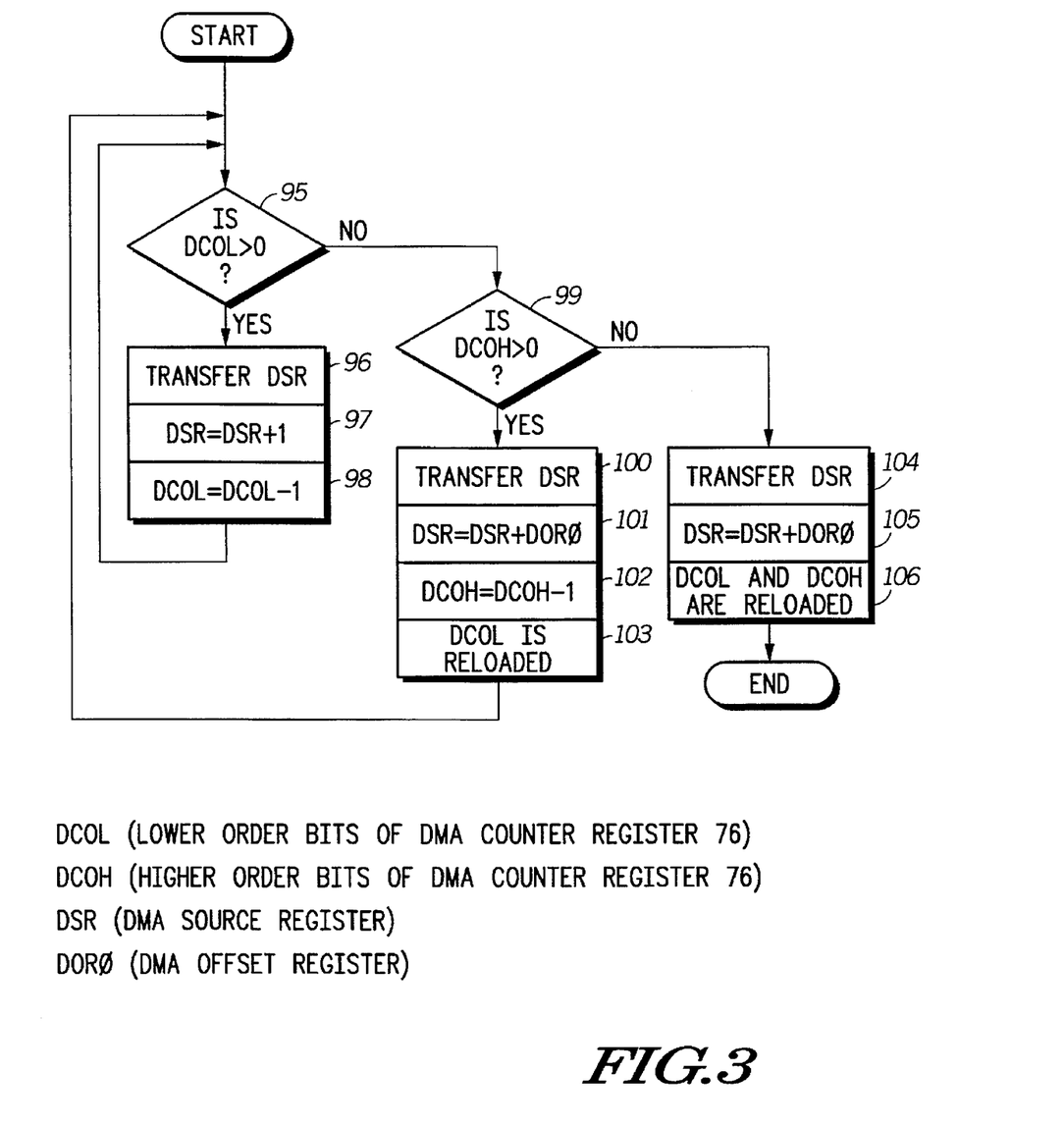
FIG. 3 illustrates in flow chart form, a two-dimensional transfer operation in accordance with one embodiment of the present invention.
Figure 4:
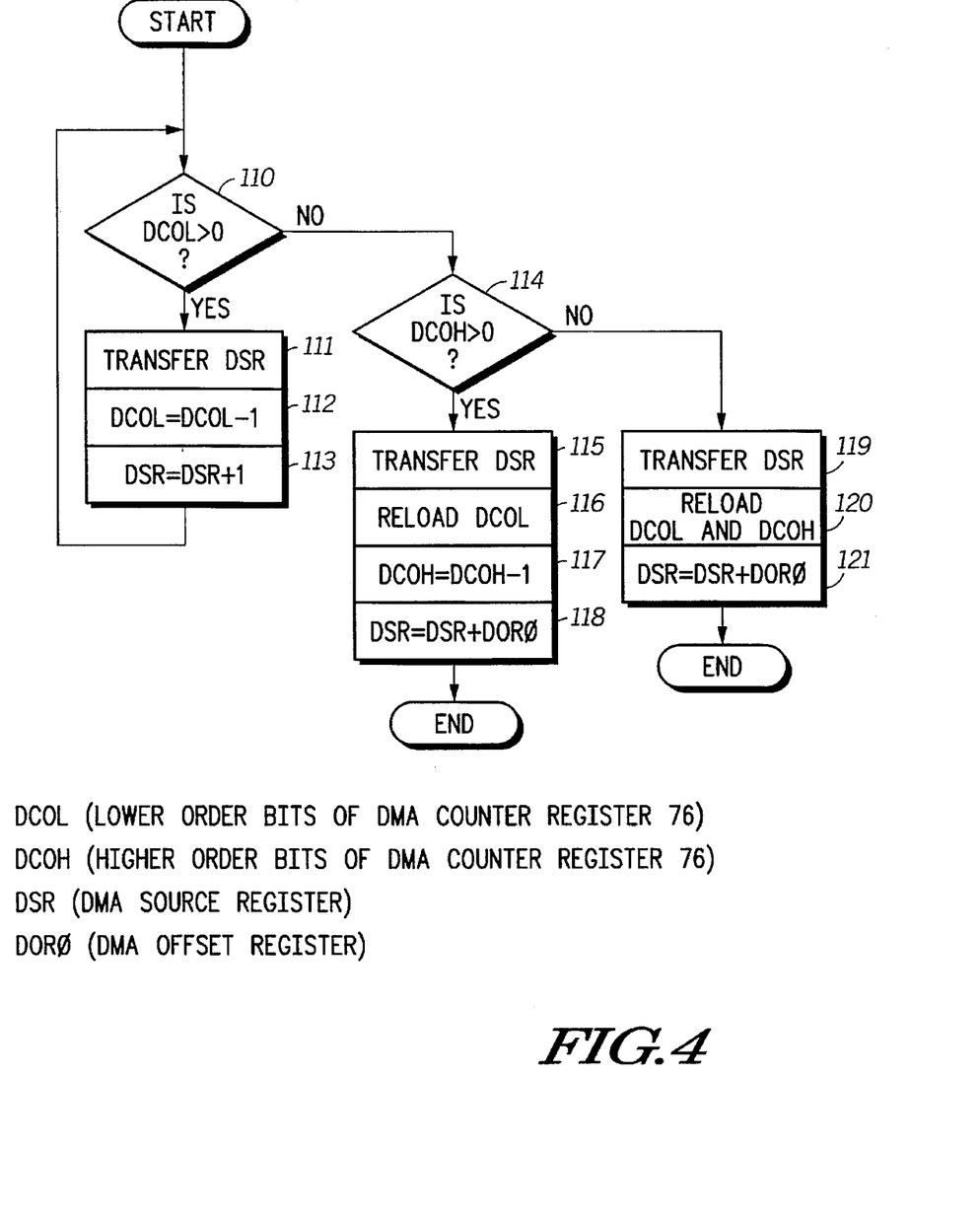
FIG. 4 illustrates in flow chart form, a line-by-line transfer in accordance with one embodiment of the present invention.
Figure 5:
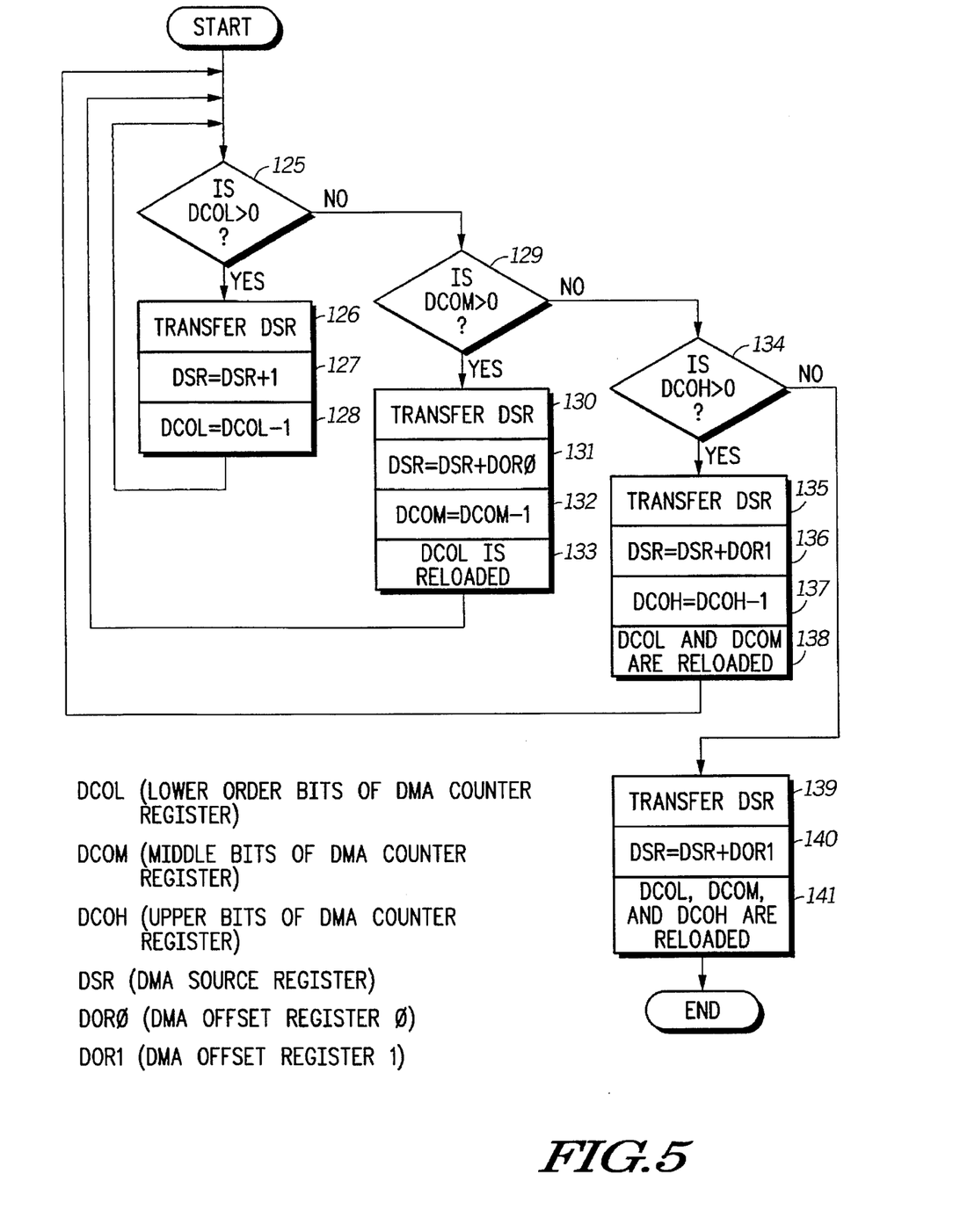
FIG. 5 illustrates in flow chart form, a three-dimensional transfer operation in accordance with another embodiment of present invention.

The present invention can be more fully described with reference to FIGS. 1-7. Each block illustrated in FIGS. 1 and 2 represents circuitry. Each block illustrated in FIGS. 3, 4, and 5 represents one or more steps in a flow chart. FIG. 1 illustrates in block diagram form, data processing system 20 in accordance with the present invention. In the embodiment illustrated in FIG. 1, data processing system 20 is a digital signal processor (DSP) and is located on a single integrated circuit. In other embodiments, data processing system 20 may be, for example, a microcomputer or a microprocessor. Data processing system 20 includes timer 22, host interface 24, enhanced serial synchronous interface (ESSD 26, serial communication interface (SCI) 28, program RAM (random access memory) and instruction cache 30, data memory 32, data memory 34, address generation unit/direct memory access (DMA) controller 36, external address bus switch 38, internal data bus switch 40, DRAM (dynamic random access memory) and SRAM (static random access memory) bus interface and instruction cache control 42, external data bus switch 44, program control unit (PCU) 46, and data arithmetic unit (ALU) 54. Program control unit 46 includes program interrupt controller 48, program decode controller 50, and program address generator 52.

Address bus 56, labeled "YAB", address bus 57, labeled "XAB", program address bus 58, labeled "PAB", and address bus 59, labeled "DAB", are coupled between address generation unit/DMA controller 36 and external address bus switch 38. Data bus 60, labeled "DDB", is coupled between host interface 24, ESSI 26, SCI 28, program RAM and instruction cache 30, X memory 32, Y memory 34, and external data bus switch 44. Data bus 61, labeled "YDB", data bus 62, labeled "XDB", program data bus 63, labeled "PDB", and program data bus 64, labeled "GDB" is coupled between internal data bus switch 40 and external data bus switch 44.

Timer 22 includes three timers that can use internal or external timing, and can interrupt data processing system 20 or signal an external device. In addition, timer 22 can be used to signal a DMA transfer after a specified number of events have occurred. Each of the three timers is coupled to a single bidirectional pin or terminal. In addition, each timer of timer 22 is coupled to bus 57, program interrupt controller 48, address generation unit/DMA controller 36, and to bus 64.

Host interface 24 provides a bidirectional interface to allow communications with another device such as a microcomputer, microprocessor, or DMA. In addition, host interface 24 is coupled to external data bus switch 44 via bus 60, program interrupt controller 48, address generation unit/DMA controller 36 and external address bus switch 38 via buses 57, 59, and 64.

Enhanced serial synchronous interface (ESSI) 26 is coupled to 12 bidirectional external pins to provide serial communication with external serial devices including, for example, one or more industry standard codecs, DSPs (digital signal processors), or microprocessors. ESSI 26 also has terminals coupled to bus 57, bus 59, bus 60, and bus 64.

Serial communication interface (SCI) 28 is coupled to 3 bidirectional external pins for providing serial communication with external devices. SCI 28 also has terminals coupled to bus 57, bus 59, bus 60, and bus 64.

The embodiment of data processing system 20 illustrated in FIG. 1 has three memory spaces: program RAM and instruction cache 30, X memory 32, and Y memory 34. In other embodiments, there may be more or fewer memory spaces. Program RAM and instruction cache 30 is coupled to address bus 58 and to data bus 63. X memory 32 is coupled to address bus 57, address bus 59, data bus 60, and to data bus 62. Y memory 34 is coupled to address bus 56, address bus 59, data bus 60, and to data bus 61.

Address generation unit/DMA controller 36 is coupled to address buses 56, 57, 58, and 59. Address generation unit/DMA controller 36 provides memory addresses to timer 22, host interface 24, ESSI 26, SCI 28, program RAM and instruction cache 30, memory 32, memory 34, external address bus switch 38. In a preferred embodiment, the DMA controller has six channels.

DRAM and SRAM bus interface and instruction cache 42 is coupled to program address bus 58 and to 14 bidirectional external pins. The instruction cache of DRAM and SRAM bus interface and instruction cache 42 functions as a buffer memory between external main memory (not shown) and program control unit 46. The instruction cache stores program instructions that are frequently used. An increase in performance may result when instruction words required by a program are available in the cache, because time required for accessing the main memory is eliminated.

Internal data bus switch 40 is coupled to data bus 60, data bus 61, data bus 62, program data bus 63, and to global data bus 64. External data bus switch 44 is coupled to internal data bus switch 40 via data bus 60, data bus 61, data bus 62, program data bus 63, and to global data bus 64. In addition, external data bus switch 44 is coupled to timer 22, host interface 24, ESSI 26, and SCI 28 via data bus 60. Internal data bus switch 40 is used for transfers between buses. Any two buses can be connected together through internal data bus switch 40. External address bus switch 38 and external data bus switch 44 couple external buses (not shown) to any internal address and internal data bus, respectively.

In program control unit 46, program interrupt controller 48 arbitrates among interrupt requests, and is coupled to timer 22, host interface 24, ESSI 26, and SCI 28. Also, program interrupt controller 48 is bidirectionally coupled to global data bus 64 and program decode controller 50. Program decode controller 50 decodes each 24-bit instruction and is bidirectionally coupled to program interrupt controller 48 and to program address generator 52. Program address generator 52 contains all of the hardware needed for program address generation, system stack, and loop control. In addition, program address generator 52 is coupled to program address bus 58 and to program data bus 63.

Data arithmetic logic unit (ALU) 54 is coupled to program data bus 63, data bus 61, and to data bus 62. Data ALU 54 performs all of the arithmetic and logical operations on data operands. ALU 54 contains registers which may be read or written over by way of buses 61 and 62. Data ALU 54 is also coupled to bus 63.

Clock generator circuits (not shown) provide clock signals to all of the blocks shown in FIG. 1. There is also test circuitry in data processing system 20 that is not shown in FIG. 1.

Figure 7:
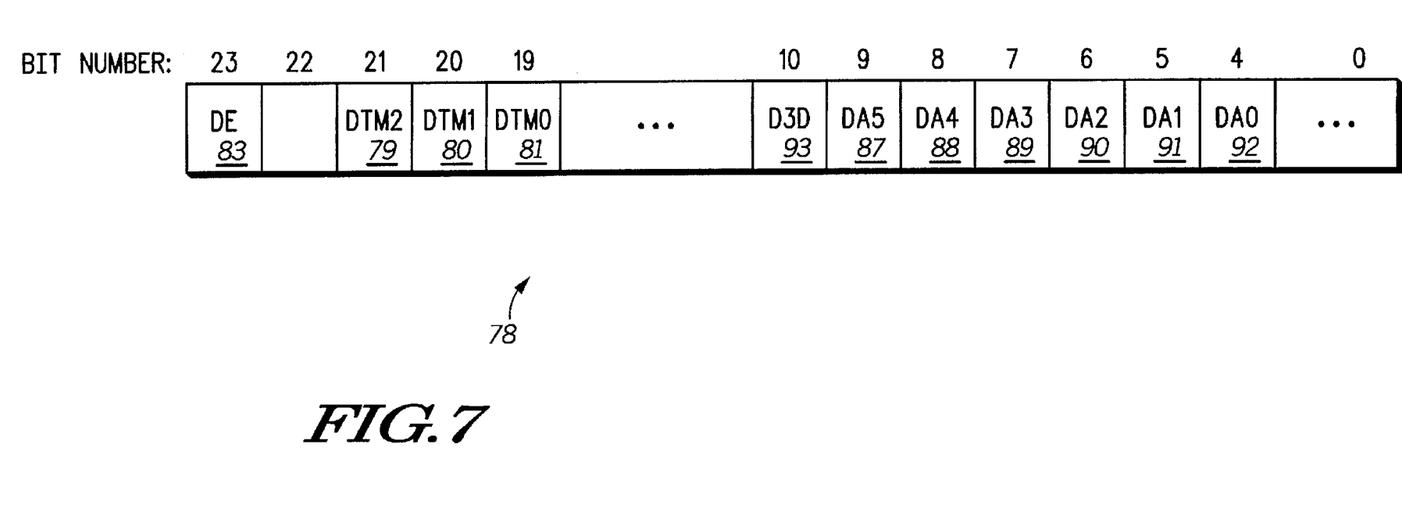
FIG. 7 illustrates in block diagram form, a DMA transfer mode register of the address generation unit portion of FIG. 2.

FIG. 2 illustrates in block diagram form, a portion 70 of address generation unit/DMA controller 36 of the data processing system of FIG. 1. Each block illustrated in FIG. 2 represents circuitry. Portion 70 comprises one of six DMA channels in address generation unit/DMA controller 36 and includes transfer counters 71, DMA counter register 76, backup register 77, DMA transfer mode register 78, DMA controller 80, DMA source registers (DSR) 82, DMA destination registers (DDR) 83, DMA offset registers (DOR) 84, source adder 85, and destination adder 86. Selected control bits of DMA transfer mode register 78 are illustrated in FIG. 7. Transfer counters 71 includes counters 72, 73, and 74. Counter 72 has a plurality of input terminals coupled to a plurality of output terminals of DMA controller 80, and a plurality of output terminals coupled to DMA counter register 76. Counter 73 has a plurality of input terminals coupled to a plurality of output terminals of DMA controller 80, and a plurality of output terminals coupled to input terminals of DMA counter register 76. Counter 74 has a plurality of input terminals coupled to a plurality of output terminals of DMA controller 80, and a plurality of output terminals coupled to input terminals of DMA counter register 76. DMA counter register 76, backup register 77, DSR 82, DDR 83, and DOR 84 are all conventional read/write static storage elements, and in the illustrated embodiment, are 24 bit registers.

To perform a multi-dimensional transfer, twenty-four bit read/write counter register 76 is divided, or partitioned, into multiple sections. In the embodiment illustrated in FIG. 2, counter register 76 is partitioned into three sections as depicted by the dashed lines. A first section labeled "DCOL" includes the lower order bits of 24 bit transfer counter register 76. Counter 74 is used to decrement DCOL. A second section labeled "DCOM" includes the middle bits of the 24 bit transfer counter register 76. Counter 73 is provided to decrement DCOM. A third section labeled "DCOH" includes the higher order bits of the 24 bit transfer counter register 76. Counter 72 is provided to decrement DCOH. The number of bits in each of the three sections can be the same, for example 8 bits per section, or the number of bits in each of the three sections can be different, for example, one section may have 12 bits and the other two sections may have 6 bits each. In another embodiment, transfer counter register 76 may be divided into two sections including DCOL and DCOH, where DCOM contains zero bits and counter 73 is not used. Each section of counter register 76 may, or may not, contain an equal number of bits.

Backup register 77 has a plurality of input terminals coupled to a second plurality of output terminals of DMA controller 80, and a plurality of output terminals coupled to counter register 76. DMA transfer mode register 78 has a plurality of output terminals coupled to a third plurality of input terminals of DMA controller 80. DMA controller 80 includes control logic for controlling data transfers between two memory elements.

Source adder 85 has a first plurality of bidirectional terminals coupled to DMA controller 80, a second plurality of bidirectional terminals coupled to DSR 82, and a plurality of input terminals coupled to offset registers 84. Destination adder 86 has a first plurality of bidirectional terminals coupled to DMA controller 80, a second plurality of bidirectional terminals coupled to DDR 83, and a plurality of input terminals coupled to offset registers 84. DSR 82 and DDR 83 are also coupled to DMA address bus 59. Source adder 85 and destination adder 86 are conventional adder circuits. Source adder 85 adds either the number one to the contents of DSR 82, or adds the contents of DOR 84 to DSR 82 as commanded by DMA controller 80. Destination adder 86 adds either the number one to the contents of DSR 82, or adds the contents of DOR 84 to DSR 82 as commanded by DMA controller 80.

DSR 82 contains a plurality of 24 bit read/write source address registers. In a preferred embodiment, there is one source address register for each DMA channel. DDR 83 contains a plurality of 24 bit read/write destination address registers. In a preferred embodiment, there is one destination address register for each DMA channel. DOR 84 contains a plurality of 24 bit read/write source offset registers. In a preferred embodiment, there are four common offset registers shared by the six DMA channels depending on their address generation mode.

DMA controller 80 permits data transfers between internal memory, external memory (not shown), and internal and external input/outputs (not shown), in any combination, in data processing system 20. FIG. 7 illustrates in block diagram form, DMA transfer mode register 78 of address generation unit portion 70 of FIG. 2. There are six transfer modes as determined by control bits 79, 80, and 81. In FIG. 7, control bits 79, 80, and 81, labeled "DTM0", "DTM1", and "DTM2", respectively, control the type of transfer initiated by DMA controller 80. Control bit 83, labeled "DE", is used to enable the channel operation. Control bit 93, labeled "D3D", controls whether a DMA transfer is a three-dimensional transfer or a non-three-dimensional transfer. When control bit 93, labeled "D3D", is negated, control bits 87–89, labeled "DA5" through "DA3" define the address generation mode for destination transfers and control bits 90–92, labeled "DA2" through "DA0" define the address generation mode for source transfers for non-three-dimensional transfers. Enabling control bit 83 triggers a single block DMA transfer in the DMA transfer mode that uses control bit 83 as a trigger, and enables a single block transfer, a single line transfer (illustrated in the flow chart of FIG. 4), or a single word transfer which uses a requesting device as a trigger.

When each of control bits 79, 80, and 81 of DMA transfer mode register 78 are negated, a block of data is transferred by address generation unit/DMA controller 36. The DMA transfer function is enabled when control bit 83 is asserted. The DMA transfer is then initiated by the first DMA request. The length of the block to be transferred is determined by transfer counter register 76 and the transfer ends when the value in transfer counter register 76 equals zero. Then transfer counter register 76 reloads itself with the initial value stored in backup register 77, and negates control bit 83.

When control bits 79 and 80 are negated and control bit 81 is asserted, a block of data is transferred, the length of the block is determined by the transfer counter register 76, and each DMA request will transfer a single word while enabled by control bit 83. When counter 76 reaches zero, it reloads itself with the initial value stored in backup register 77, and negates control bit 83.

A line-by-line transfer is initiated when control bits 79 and 81 are negated and control bit 80 is asserted. In a line-by-line transfer, a block of data is transferred, the length of the block is determined by DMA transfer counter register 76, and each DMA request will transfer a "line". A "line" is defined as the number of words indicated by the DCOL section of counter register 76. A transfer is enabled by control bit 83. The transfer is completed after all three sections of transfer counter register 76 decrements to zero, then it reloads itself with the initial value stored in backup register 77, and negates control bit 83.

When control bit 79 is negated and control bits 80 and 81 are asserted, a block of data is transferred, the length of the block is determined by DMA transfer counter register 76 and the transfer is initiated by asserting control bit 83. The transfer is completed when DMA transfer counter register 76 decrements to zero, then it reloads itself with the initial value from backup register 77 and negates control bit 83.

When control bit 79 is asserted and control bits 80 and 81 are negated, a block of data is transferred, the length of the block is determined by DMA transfer counter register 76, the transfer is enabled by control bit 83, and initiated by a DMA request. The transfer is completed when DMA transfer counter register 76 is decremented to zero, then it is reloaded with the initial counter values from backup register 77. Control bit 83 is not negated at the end of the block transfer, allowing the DMA channel (portion 70) to be ready for a new DMA transfer request or trigger.

When control bits 79 and 81 are asserted and control bit 80 is negated, a single word transfer is enabled when control bit 83 is asserted. The single word transfer is initiated by every DMA request. When the contents of DMA transfer counter register 76 is decremented to zero, it is reloaded with its initial value from backup register 77. Control bit 83 is not automatically negated, allowing the DMA channel (portion 70) to be ready for a new transfer request or trigger.

When control bit 93 is negated, either a uni-dimensional block transfer is performed or a two-dimensional transfer is performed. When a uni-dimensional block transfer is performed, transfer counters 71 function as a single counter and DMA transfer counter register 76 is not partitioned into multiple sections. When a two-dimensional transfer is performed, transfer counters 71 function as two separate counters and DMA transfer counter register 76 is partitioned into two sections, DCOL (lower order bits) and DCOH (higher order bits). Control bits 91 and 92 determine which of the four offset registers in DOR 84 are used to provide offset information for the source address and bits 88 and 83 determine which of the offset registers are used for the destination address.

During a two-dimensional transfer operation, DMA transfer counter register 76 is divided into two sections, DCOL and DCOH. The number of bits used for a two-dimensional transfer may not be the same for DCOL and DCOL. Note that the middle bits of DMA counter register 76, labeled "DCOM" are not used during a two-dimensional transfer operation and DCOL and DCOH each comprise 12 bits of 24 bit DMA transfer counter register 76.

When control bit 93 is asserted, the DMA transfer is three-dimensional and control bits 87-92 are divided into three groups: control bits 91 and 92 define the DMA transfer counter mode of DMA transfer counters 71; control bit 90 defines the address mode; and control bits 87-89 define the address generation mode. When control bit 93 is asserted, either a source addressing mode or a destination addressing mode or both are three-dimensional. In the three-dimensional address generation mode of operation, data is accessed at consecutive addresses for a given number of times controlled by the DCOL bits of DMA transfer counter register 76. Then, a value from DOR 84 is added to the generated address. This process is repeated for another predetermined number of times as determined by the DCOM bits of DMA transfer counter register 76. Then, another offset value is added to the generated address which may or may not be the same value as the previous offset value from DOR 84. The process is repeated for a third predetermined number of times as determined by the value in the DCOH bits of DMA transfer counter register 76.

There are three counter modes as defined by control bits 91 and 92. The counter modes control the number of bits allocated to each of DCOL, DCOM, and DCOH of transfer counter register 76. In the first counter mode, entered by negating both of control bits 91 and 92, DCOL has bits 0–5 of transfer counter register 76, DCOM has bits 6–11, and DCOH has bits 12–23. In the second counter mode, entered by negating control bit 91 and asserting control bit 92, DCOL has bits 0–5, DCOM has bits 6–17, and DCOH has bits 18–23. In the third counter mode, entered by asserting control bit 91 and negating control bit 92, DCOL has bits 0–11, DCOM has bits 12–17, and DCOH has bits 18–23.

The offset values in DOR 84 defines the amount of offset when DCOL or DCOM equals zero. In two-dimensional transfer mode, only one offset register of DOR 84 is needed. In three-dimensional transfer mode, two offset registers are needed. When DCOL equals zero and DCOM does not equal zero, a first offset value is used to increment the generated address. When both DCOL and DCOM equals zero, a second offset value is used to increment the generated address.

Advantages of multi-dimensional transfers: little or no software overhead; flexibility; source and destination are independently programmable; and different sizes available for each DCOL, DCOM, and DCOH, for example, 8:8:8 or 12:6:6. The self-initialization feature is very useful in processors which have multiple DMA channels, then the software can allocate different tasks to the DMA channels. In addition, by reloading, or self-initializing the DMA transfer counter, performance is increased by minimizing main processor overhead for programming the DMA channels, and software overhead caused by the need to reprogram the DMA channels after the block transfer is complete. This is especially useful when dealing with small blocks and complex data structure. Also, the three-dimensional transfer mode is also useful for accessing a number of two-dimensional memory arrays.

FIG. 3 illustrates in flow chart form, the steps required for a two-dimensional transfer operation in accordance with one embodiment of the present invention. Diamond-shaped boxes 95 and 99 represent decision steps, and rectangular boxes 96–98, 100–103, and 104–106 represent steps which are performed in order to operate a two-dimensional DMA transfer using portion 70 of address generation unit/DMA controller 36.

At decision step 95, controller 80 determines if the lower order bits of DMA counter register 76 (DCOL) are greater than zero. If the DCOL bits are greater than zero, the "yes" path is taken. When the DCOL bits are equal to zero, the "no" path is taken to decision step 99. At step 96, the contents of a selected register of DSR 82 are transferred to destination, either internal or external. Note that the steps referring to DSR transfer apply equally to DDR transfers. At step 97, the selected register in DSR 82 is incremented by one by source adder 85, and at step 98 DCOL is decremented by one. The program returns to decision step 95 and repeats steps 95–98 until DCOL is equal to zero, at which point the "no" path is taken to decision step 99.

At step 99, DMA controller 80 determines if the higher order bits (DCOH) of DMA counter register 76 are greater than zero. If the DCOH bits are greater than zero, the "yes" path from decision step 99 is taken. The address in the DSR is transferred at step 100. At step 101, the address in DSR is incremented by an offset value taken from register DOR0 in DOR 84 by source adder 85. DCOH is decremented by one at step 102, and DCOL is reloaded, or reinitialized at step 103 from backup register 77. The program then returns to decision step 95 and steps 95–98 are repeated until transfer counter register DCOL is equal to zero. The "no" path is then taken from decision step 95 to decision step 99, steps 99–103 are performed and steps 95–98 are repeated until counter register DCOL equals zero. When DCOH equals zero, steps 104–106 are completed and the transfer ends with DCOL and DCOH being reloaded and ready for the next DMA request.

At step 104, the generated address in DSR is transferred, then at step 105 the generated address in DSR is incremented by the offset value in register DOR0 of DOR 84. At step 106, DCOL and DCO/-I are reloaded with their initial values from backup register 77 making portion 70 of address generation unit/DMA controller 36 ready for another DMA request that requires the same initial counter values. If different initial counter values are required, they are loaded by program control unit 46 before a DMA transfer can occur.

FIG. 4 illustrates in flow chart form, a line-by-line transfer in accordance with another embodiment of the present invention. Diamond-shaped boxes 110 and 114 represent derision steps, and rectangular boxes 111–113, 115–118, and 119–121 represent steps which are performed in order to operate one embodiment of the line-by-line operation of portion 70 of address generation unit/DMA controller 36. The line-by-line transfer operation of FIG. 4 is essentially the same as the two-dimensional transfer operation illustrated in the flow chart of FIG. 3, except that after DCOL equals zero, the transfer is halted until another trigger is received. When a new trigger is received, the DMA transfer continues.

The line-by-line transfer allows small blocks, or lines, to be transferred without interrupting the processor to handle the DMA request and to reload parameters, as is common in prior art data processing system having DMA. The line-by-line transfer is useful for transferring contents of a circular buffer to another memory space. Every time the circular buffer is full, its contents are transferred, and the address in the address register in DSR 82 is wrapped around to point to the first address. The line-by-line transfer is also useful for transferring "lines" of a monitor, in order to allow filtering of the display information.

Still referring to FIG. 4, with an initial address stored in a register in DSR 82, a transfer is started when a trigger or a request is received. At decision step 110, if DCOL is greater than zero, the "yes" path is taken, and at step 111, a transfer of the address in the register in DSR 82 is initiated. At step 112, DCOL is decremented by one, and at step 113 DSR is incremented by one. The program returns to decision step 110, and repeats until DCOL equals zero. Then, the "no" path is taken from decision step 110 to decision step 114. If DCOH greater than zero, the "yes" path is taken from decision step 114 to step 115. At step 115, the generated address from DSR is transferred. Then DCOL is reloaded from backup register 77 to DMA transfer counter register 76 at step 116. At step 117, counter 72 decrements DCOH by one. At step 118, an offset value from register DOR0 in DOR 84 is added to DSR 82 by source adder 85. The transfer is then halted until a new request is received.

If, at decision step 114, DCOH is equal to zero, the "no" path is taken to step 119. At step 119, the generated address in DSR 82 is transferred. At step 120, DCOL and DCOH is reloaded with initial values from backup register 77. At step 121, DSR 82 is incremented by the offset value stored in DOR0 of DOR 84. The transfer is then halted. Since DCOL and DCOH of counter register 86 has been reinitialized, DMA controller 80 is ready for a new transfer that requires the same counter values as the previous transfer.

FIG. 5 illustrates in flow chart form, a three-dimensional transfer operation in accordance with another embodiment of the present invention. Diamond-shaped boxes 125, 129, and 134 represent decision operations, and rectangular boxes 126–128, 130–133, 135–138, and 139–141 represent steps which are performed in order to operate one embodiment of the three-dimensional transfer operation of portion 70 of address generation unit/DMA controller 36.

A three-dimensional DMA transfer is started when initial values are loaded in DMA transfer counter register 76, a starting address is provided to one of the registers in DSR 82 or DDR 83, and a request is made by program control unit 46. Note that even though a transfer from a selected register in DSR 82 is illustrated in FIGS. 3–5, the steps in FIGS. 3–5 apply equally to a transfer from a selected register in DDR 84.

After the three-dimensional DMA has been initiated, at decision step 125 it is determined if the lower order bits of DMA counter register 76 (DCOL) are greater than zero. If the DCOL bits are greater than zero, the "yes" path is taken. When the DCOL bits are equal to zero, the "no" path is taken to decision step 129. Assuming DCOL is greater than zero, at step 126 the contents of the selected register of DSR 82 are transferred to the receiving memory space, either internal or external. At step 127, the register in DSR 82 is incremented by one by source adder 85, and at step 128 DCOL is decremented by one by transfer counter 74. The program returns to decision step 125 and repeats the process until DCOL is equal to zero, at which point the "no" path is taken to decision step 129.

At decision step 129, controller 80 determines if the middle bits (DCOM) of DMA counter register 76 are greater than zero. If the DCOM bits are greater than zero, the "yes" path from decision step 129 to step 130 is taken. At step 130, the generated address in the DSR is transferred. At step 131, the generated address in DSR is incremented by an offset value taken from register DOR0 in DOR 84 by source adder 85. DCOM is decremented by one at step 132 by transfer counter 73, and DCOL is reloaded, or reinitialized at step 133 from backup register 77. The program then returns to decision step 125 and the process comprising steps 125–128 is repeated until DCOL is equal to zero. The "no" path is taken from step 125 to decision step 129 and steps 129–133 then 125–128 are repeated until DCOM equals zero.

When DCOM equals zero, the "no" path from decision step 129 is taken. At decision step 134, DMA controller 80 determines if DCOH is greater than zero. If DCOI-I is greater than zero, the "yes" path is taken to step 135. At step 135, the contents of DSR are transferred. At step 136, DSR is incremented by an offset value from register DOR1 of DOR 84. At step 137, DCOH is decremented by one by transfer counter 72. At step 138, DCOL and DCOM are reloaded and steps 125–128 and steps 129–133 are repeated as before. When DCOH is equal to zero, the "no" path is taken from decision step 134 to step 139. At step 139, the generated address at DSR is transferred. At step 140, DSR is incremented by another offset value from register DOR1 of DSR 84. At step 141, DCOL, DCOM, and DCOH are reloaded with their initial values from backup register 77 and the transfer is halted. Portion 70 of address generation unit/DMA controller 36 is ready for another DMA request that requires the same counter values. If different counter values are required, they are loaded by program control unit 46 before another DMA transfer can occur.

Figure 6:
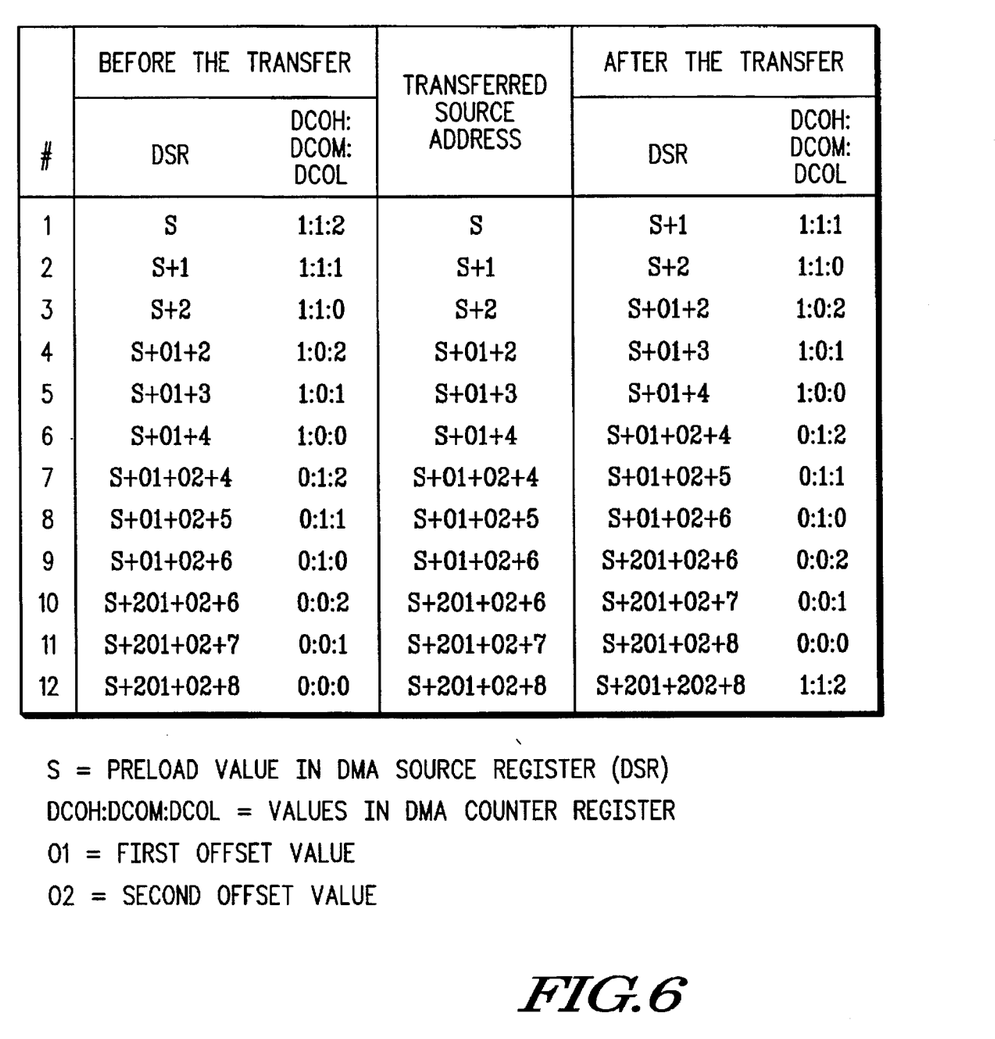
FIG. 6 illustrates in tabular form, DMA source register values and DMA counter values for an example three-dimensional transfer operation in accordance with the flow chart of FIG. 5.

FIG. 6 illustrates in tabular form, values in DMA source register 82 and DMA counter register 76 for an example of a three-dimensional DMA transfer operation in accordance with one embodiment of the present invention. An example of a three-dimensional transfer is provided as an aid to understanding the invention. In the example illustrated in FIG. 6, "S" represents a preloaded starting address in DMA source register 80. "DCOL" represents the lowest order bits of the first section of DMA counter register 76 of FIG. 2. "DCOM" represents the middle bits of the second section of DMA counter register 76 of FIG. 2. "DCOH" represents the highest order bits of the third section of DMA counter register 76 of FIG. 2. As illustrated on line #1 of FIG. 6, DCOH has an initial value of 1, DCOM has an initial value of 1, and DCOL has initial value of 2. O1 is a first offset value stored in a selected register of offset registers 84. O2 is a second offset value stored in another selected register of offset registers 84. O1 may be equal to O2.

On line #1, address S in a selected source register of DSR 82 is transferred, address S is incremented by one resulting in DSR 82 storing generated address S+1. DCOL is decremented by 1 by transfer counter 74, causing the value in DCOL to equal 1. On line #2, generated address S+1 is transferred. Generated address S+1 is then incremented by 1 by source adder 85, causing generated address S+1 to become generated address S+2. DCOL is decremented by one by transfer counter 74, so that the value in DCOL equals zero. On line #3, generated address S+2 is transferred, since the value in DCOL is equal to zero, first offset value O1 is added to the generated address in DSR 82, the generated address becomes S+O1+2, and DCOM is decremented to equal zero. DCOL is reloaded with its initial value of 2 from backup register 77.

As can be seen in FIG. 6, transfers are made to an offset location while DCOL is decremented to zero on line #3–5. DCOM is reloaded on line #6 to its initial value and a second offset is added to the generated address. DCOH is decremented when DCOM and DCOL both equal zero on line #6. Then both DCOL and DCOM are reloaded and transfers are made until DCOM and DCOL both equal zero again. On line #12, the last transfer is completed and DCOH, DCOM, and DCOL are reloaded with their initial values, ready for another DMA transfer requiring the same transfer parameters.

By performing multi-dimensional DMA transfers in accordance with the present invention, a processor in a data processing system is not interrupted as often to initiate or halt a DMA transfer, freeing the processor for other tasks. Also, there is little or no software overhead, source and destination are independently programmable, and different sizes are available for each of DCOL, DCOM, and DCOH. The self-initialization feature is very useful in processors which have multiple DMA channels, then the software can allocate different tasks to each of the DMA channels. In addition, by reloading, or self-initializing the DMA transfer counter, performance is increased by minimizing main processor overhead for programming the DMA channels, and software overhead caused by the need to reprogram the DMA channels after the block transfer is complete. This is especially useful when dealing with small blocks and complex data structure.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A method for transferring data in a data processing system, the method comprising the steps of:
    storing a first address of a location in a memory;
    storing a counter value;
    storing an offset value;
    transferring a first block of data in the memory at consecutive generated addresses for a first predetermined number of times, as determined by the counter value, starting at the first address;
    adding the offset value to a last generated address; and transferring a second block of data in the memory at consecutive
    generated addresses starting at a second address equal to the last generated address plus the offset value and transferring data in the memory at consecutive generated addresses for the first predetermined number of times.

2. The method of claim 1, further comprising the step of:
    storing a second counter value, the second counter value for determining a number of times the offset value is added to the last generated address following a data block transfer.

3. The method of claim 2, further comprising the step of restoring the first and second counter value after the steps of transferring data are complete.

4. A method for multi-dimensionally transferring blocks of data in a data processing system, the data processing system comprising an address storage element, an offset storage element, and first and second counter storage elements, the method comprising the steps of:
    loading a first address in the address storage element;
    loading an offset value in the offset storage element;
    loading a first value in the first counter storage element, and a second value in the second counter storage element;
    setting a predetermined value for determining a size of one of the blocks of data to be transferred;
    if the first value is greater than the predetermined value, transferring the first address from the address storage element to a destination storage element, incrementing the first address to create a second address, and decrementing the first value in the first counter storage element;
    if the first value is equal to the predetermined value and the second value is greater than the predetermined value, transferring the first address from the address storage element to the destination storage element, adding the offset value to the first address, and decrementing the second value in the second counter storage element; and
    if the first value is equal to the predetermined value and the second value is equal to the predetermined value, transferring the first address from the address storage element to the destination storage element, and adding the offset value to the first address.

5. The method of claim 4, further comprising the step of reloading the first value into the first counter storage element if the first value is equal to the predetermined value and the second value is greater than the predetermined value.

6. The method of claim 4, further comprising the step of reloading the first value in the first counter storage element and reloading the second value into the second counter storage element if the first value is equal to the predetermined value and the second value is equal to the predetermined value.

7. The method of claim 4, wherein the method for multi-dimensionally transferring blocks of data is characterized as being a line-by-line transfer.

8. A method for multi-dimensionally transferring blocks of data in a data processing system, the data processing system comprising an address storage element, an offset storage element, and a counter storage element, the method comprising the steps of:

loading a first address in the address storage element;

loading an offset value in the offset storage element;

partitioning the counter storage element into at least a first section and a second section;

loading a first value in the first section, and a second value in the second section;

setting a predetermined value in a controller for determining a size of one of the blocks of data to be transferred;

if the first value is greater than a predetermined value, transferring the first address from the address storage element to a destination storage element, incrementing the first address to create a second address, and decrementing the first value;

if the first value is equal to the predetermined value and the second value is greater than the predetermined value, transferring the first address from the address storage element to the destination storage element, adding the offset value to the first address, and decrementing the second value in the second counter storage element; and if the first value is equal to the predetermined value and the second value is equal to the predetermined value, transferring the first address from the address storage element to the destination storage element, and adding the offset value to the first address.

9. The method of claim 8, further comprising the step of reloading the first value into the first section if the first value is equal to the predetermined value and the second value is greater than the predetermined value.

10. The method of claim 8, further comprising the step of reloading the first value in the first section and reloading the second value into the second section if the first value is equal to the predetermined value and the second value is equal to the predetermined value.

11. The method of claim 8, wherein the method for multi-dimensionally transferring blocks of data is characterized as being a line-by-line transfer.

12. A direct memory access controller for performing a multidimensional data transfer in a memory in a data processing system, comprising:

an address storage element for storing an address;

an offset storage element for storing an offset value;

an adder, coupled to the address storage element and to the offset storage element;

a first counter storage element for storing a first count value, the count value for determining a number of transfers of the multi-dimensional data transfer that comprise a block of data;

a second counter storage element for storing a second count value, the second count value for determining a number of the offsets of the multi-dimensional data transfer; and a control logic circuit, coupled to the adder, the offset storage element, the address storage element, and the first and second counter storage elements, the control logic circuit for controlling data transfer to the memory by incrementing the address for the number of transfers according to the first count value, adding the offset value to a last incremented address with the adder and transferring data to the memory for the number of transfers determined by the second count value.

13. The direct memory access controller of claim 12, further comprising a back-up register, coupled to the counter storage element, for replacing an initial value in the counter storage element after the multi-dimensional data transfer is complete.

14. The direct memory access controller of claim 12, wherein the address storage element comprises a source address register and a destination address register.

15. The direct memory access controller of claim 12, further comprising a transfer mode storage element, coupled to the control logic circuit, for storing mode information.

16. The direct memory access controller of claim 12, wherein the first and second counter storage elements are a first section and a second section, respectively, of a partitioned storage element, the first section storing a number used to determine a length of a data block, and the second section for storing a number regarding how many data blocks are to be transferred.

17. The direct memory access controller of claim 16, wherein the offset value is added to the address when a number stored in the second section is equal to a predetermined amount.

18. The direct memory access controller of claim 12, further comprising a third counter storage element, wherein a value in each of the three counter storage elements.

* * * * *